Nov. 8, 1938.  F. E. TAYSEN  2,135,860
UNDERGROUND WATER TRANSFER SYSTEM
Filed Oct. 25, 1937
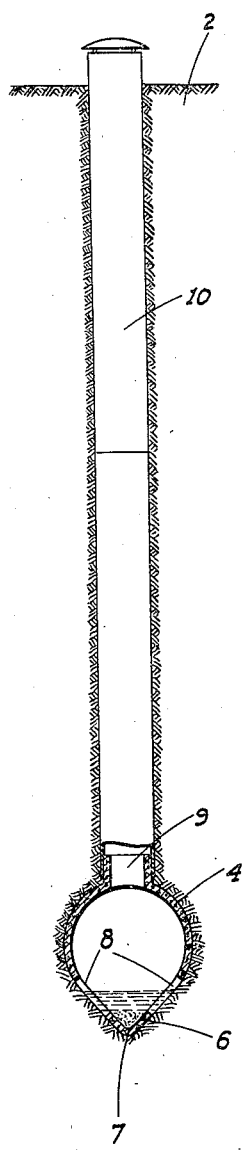
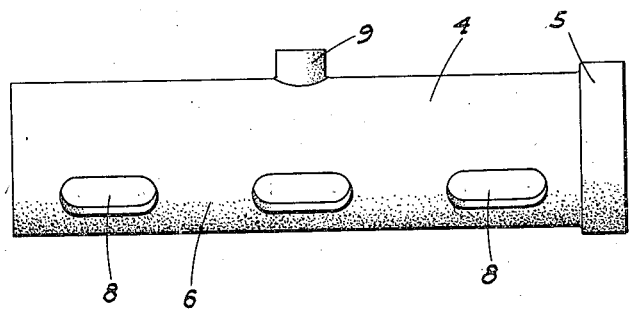
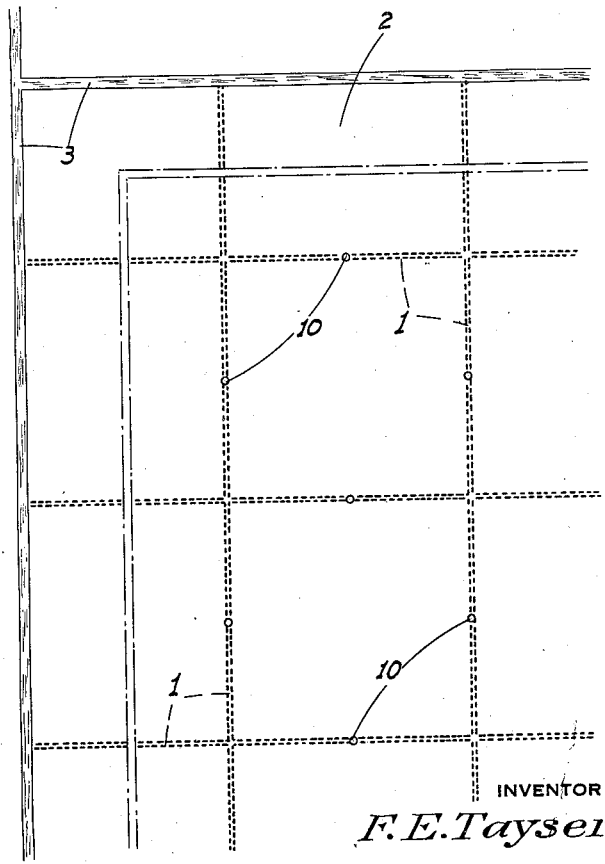
INVENTOR
F. E. Taysen
BY
ATTORNEY Patented Nov. 8, 1938

2,135,860

UNITED STATES PATENT OFFICE 2,135,860

UNDERGROUND WATER TRANSFER SYSTEM

Frederick E. Taysen, Lincoln, Calif.

Application October 25, 1937, Serial No. 170,827

2 Claims. (Cl. 61—11)

This invention particularly relates to sub-surface drainage, my principal object being to provide a system, which includes a novel form of water-carrying conduit so arranged that swampy lands will be automatically drained and subsequently maintained in a suitable condition for planting or other use.

The system is also admirably adapted for the opposite purpose, or that of supplying sub-surface moisture to the ground.

In either case, the conduits forming the system are adapted to be permanently laid at such a depth as to offer no interference with plowing or other ground working operations.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side view of one of my novel conduit sections.

Figure 2 is a cross section of the same, shown as laid in place and in operation.

Figure 3 is a fragmentary diagram of the system showing one arrangement of the drainage or irrigation conduits.

Referring now more particularly to the characters of reference on the drawing, my system contemplates laying a number of rows of conduits indicated generally at 1, below the area 2 to be drained or irrigated, and laid a sufficient distance below the ground to be positively clear of any implements which may be used to work the ground. The actual size of the conduits of course depends on the volume of water to be handled. The rows of conduits are preferably laid in crossing arrangement, at intervals whose spacing depends on the volume of water to be withdrawn or supplied, or on the nature of the stratum in which they are laid, and such crossing arrangement may be either right angular or diagonal as the shape of the area or other factors may determine.

At their outfall end (in a drainage system), the various conduit rows empty into a drainage ditch 3. If the system is used for sub-surface irrigation, the ditch becomes the source of water supply and the adjacent ends of the conduits are of course their intake end.

The conduits themselves, whose particular shape is largely responsible for the successful operation of the system, each consist of a number of initially separate lengths or sections 4. These sections may be made of concrete, terra cotta or metal, as may be desired. Each section may be provided at one end with the conventional bell 5 for coupling engagement with the end of an adjacent section. The section is of peculiar shape in cross section, being circular about its upper half and its opposite sides, below the center, being substantially straight as at 6 and converging to approximately a blunt point at the bottom as shown at 7.

Located in these converging side portions are longitudinally extending slots 8. The peculiar top or pear shaped conduit section, and the location of the slots therein, is advantageous for various reasons. For one thing, the low position of the slots in the conduit tends to prevent the same from possibly choking up with sand or silt, since the space in the conduit below the slots for holding such solid matter is negligible. At the same time, the slots lie in planes substantially midway between horizontal and vertical, and they are thus in the most advantageous position to receive or discharge water.

Also, the odd shape of the conduit sections insures their being all laid in one position, so that the slots will always be in the correct positions without any care on the part of the layer being necessary.

Certain ones of the conduits are made with an air vent collar 9 on top, from which an air vent flue 10 extends upwardly to a termination above ground level as shown in Fig. 2. These vents are disposed only at relatively remote intervals in the system as indicated in Fig. 3.

Vents when spaced one hundred feet apart are ample, the purpose of the vents being to prevent a tendency to vacuum (or air pressure) being formed in the system which would prevent a free flow of water therethrough, either in one direction or the other.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In an underground water transfer system, a plurality of connected conduit sections, each such conduit section being non-circular in cross section and of greatest diameter in the central longitudinal plane thereof, the section having a plurality of side openings therein below said plane, a coupling bell formed on one end of the section and symmetrical with the cross sectional configuration thereof, and an upstanding air vent collar formed on top of certain ones of said connected conduit sections.

2. In an underground water transfer system, a plurality of connected conduit sections, each such conduit section being non-circular in cross section and of greatest diameter in the central longitudinal plane thereof, the sides of the section below said plane being substantially straight and converging to the bottom of the section; there being a plurality of longitudinally extending and elongated slots of substantial width formed in said sides and terminating at their lower edges relatively close to the point of convergence of said sides.

FREDERICK E. TAYSEN.